US009355339B2

(12) United States Patent
Beretta et al.

(10) Patent No.: US 9,355,339 B2
(45) Date of Patent: May 31, 2016

(54) SYSTEM AND METHOD FOR COLOR REPRODUCTION TOLERANCES (75) Inventors: Giordano B. Beretta, Palo Alto, CA (US); Eric Hoarau, San Francisco, CA (US); I-Jong Lin, Half Moon Bay, CA (US); Jun Zeng, Sunnyvale, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 14/126,661

(22) PCT Filed: Aug. 26, 2011

(86) PCT No.: PCT/US2011/049414
§ 371 (c)(1),
(2), (4) Date: Dec. 16, 2013

(87) PCT Pub. No.: WO2013/032428
PCT Pub. Date: Mar. 7, 2013

(65) Prior Publication Data
US 2014/0160501 A1    Jun. 12, 2014

(51) Int. Cl.
G06K 15/02 (2006.01)
H04N 1/60 (2006.01)
H04N 1/62 (2006.01)
G06F 3/12 (2006.01)

(52) U.S. Cl.
CPC ............ *G06K 15/027* (2013.01); *G06F 3/1208* (2013.01); *H04N 1/6033* (2013.01); *H04N 1/622* (2013.01)

(58) Field of Classification Search
CPC .... G06K 15/027; H04N 1/622; H04N 1/6033
USPC .............................. 358/1.9, 504, 518; 382/167
See application file for complete search history.

(56) References Cited

U.S. PATENT DOCUMENTS

| 5,938,620 A | 8/1999 | Daxer |
| 6,210,006 B1 | 4/2001 | Menozzi |
| 7,502,032 B2 | 3/2009 | Richardson et al. |
| 2004/0012801 A1 | 1/2004 | Murakami |
| 2004/0184051 A1* | 9/2004 | Bailey ................. H04N 1/6033 358/1.9 |
| 2006/0071938 A1* | 4/2006 | Richardson et al. .......... 345/591 |
| 2006/0139665 A1* | 6/2006 | Clark ............................. 358/1.9 |

(Continued)

FOREIGN PATENT DOCUMENTS

KR    20070010812    1/2007

OTHER PUBLICATIONS

Spectrophotometer calibration and cedification External HPL-1999-2, HP Laboratories, Jan. 1999, http://www.hpl.hp.com/techreports/1999/HPL-1999-2.html.

(Continued)

*Primary Examiner* — Jamares Q Washington
(74) *Attorney, Agent, or Firm* — Fletcher Yoder (57) ABSTRACT Systems and methods for color reproduction tolerances are provided. One method according to the present disclosure may involve selecting a printing configuration, printing a color scale sample using the printing configuration, and scoring the printed color scale sample based at least in part on an extent to which transpositions of the color swatches occur over a color range. When the score of the printed color scale sample indicates a print quality is or will be above a threshold level of quality, a print job using colors of the color range may be printed using the printing configuration.

11 Claims, 11 Drawing Sheets (56) References Cited

U.S. PATENT DOCUMENTS

| 2008/0204772 | A1 | 8/2008 | Kauffman |
| 2009/0059253 | A1* | 3/2009 | Kuno ............................. 358/1.9 |
| 2009/0184974 | A1 | 7/2009 | Kuno |
| 2010/0085587 | A1 | 4/2010 | Hayward et al. |
| 2010/0125221 | A1 | 5/2010 | Bassi et al. |
| 2012/0268755 | A1* | 10/2012 | St. Martin et al. ............. 358/1.9 |

OTHER PUBLICATIONS

Standard practice for establishing color and gloss tolerances, ASTM Standard D 3134-8, Dec. 2003.

Xerox System institute, Color encoding standard, vol. XNSS 289005, Xerox Corporatic , Surmyvale, May 1990. Xerox System Integration Standard.

ASTM Committee E12.11, Standard guide for selection, evaluation, and training of observers, ASTM Standard E 1499-97 (2003). Dec. 2003.

Dean Farnsworth, The Farnsworth-Munsell 100-hue and dichotomous tests for color vision, Journal of the Optical Society of America 33 (1943), No. 10, 568-578.

Lawler et al.; "Color Discrimination is Alive and Well," Sep. 19, 2000; http://www.creativepro.com/article/color-discrimination-is-alive-and-well>.

R.M. Evans, Visual processes and color photography, Journal of the Optical Society of America A 3 (1943), No. 1, 579-614.

Rainer Wagner, Tolerancias en las mediciones espectrofotométricas, World Wide Web page. 1999, http://wpc.4t.com/wpcinfo10.html, last checked Sep. 30, 2010.

Spectrophotometer calibration and certification, External HPL-1999-2, HP Laboratories, Jan. 1999, http://www.hpl.hp.com/techreports/1999/HPL-1999-2.html.

Standard practice for establishing color and gloss tolerances, ASTM Standard D 3134-97 (2003), Dec. 2003.

Xerox System Institute, Color encoding standard, vol. XNSS 289005, Xerox Corporation, Sunnyvale, May 1990, Xerox System Integration Standard.

Deans Farnsworth, The Farnsworth-Munsell 100-hue test for the examination of color discrimination, Munsell Color, Macbeth, Division of Kolimorgen Instrument Corp., 405 Little Britain Road New-Windsor NY 2nd ed. 1957 Manual.

Giordano B. Beretta and Robert R. Buckley, Trends in color imaging on the Internet, 9th Congress of the International Colour Association, vol. 4421 AIC SPIE 2002.

Giordano B Beretta, Internet's impact on publishing, Color Imaging: Device-Independent Color, Color Hard Copy and Graphic Arts II (San Jose) (Giordana B Beretta and Reinier Eschbach) vol. 3018 SPIE Apr. 1997.

Jonathan Phillips, Comparing image quality of print-on-demand books and photobooks from web-based vendors Journal of Electronic Imaging 19(1) Jan.-Mar. 2010.

L. Kelly and Deane Judd, The ISCC-NBS method of designating colors and a dictionary of color names, vol. 553, National Bureau of Standanrds, Washington, Nov. 1955.

* cited by examiner

SYSTEM AND METHOD FOR COLOR REPRODUCTION TOLERANCES

BACKGROUND

Despite the onset of the "electronic age," there is still significant demand for print products. Indeed, commercial print may have annual retail sales totaling more than $700 billion. Print service providers (PSPs) fulfill this demand by printing a vast array of print products, such as photographs and brochures, school course materials, periodicals and books, and advertisements and product packaging. Many of these print products are colored, and costumers desire these colors to be faithfully reproduced.

Printed products are not perfect replicas of the originals. Indeed, average color errors in the range of $3<\Delta E<7$ (CIE 1976 (L*a*b*)) are routine in commercial print processes run by skillful operators. Less skillful operators or less expensive operations can produce even larger color errors. Moreover, color errors may become more pronounced when market pressures force down production costs. To ensure customer satisfaction while maximizing profits, PSPs may negotiate service license agreements (SLAs) to specify precise color tolerances. The specification of color tolerances may be essential for PSP profit maximization, since a print job with a lower color tolerance can be run on a less accurate printing press or by a less skillful operator.

The standard practice for establishing color tolerances is generally described in ASTM standard D 3134. Standards such as ASTM standard D 3134 may recommend expressing color differences through the CIE 1976 (L*a*b*) color difference equations. More specifically, ASTM standard D 3134 states that color tolerances are preferably set experimentally by classifying specimens visually against a standard, than measuring the specimens standard and plotting the value on a CIE LAB $\Delta a^*$, $\Delta b^*$ constant lightness ($L^*=k, k \in [0,100]$) plane. For the L* tolerance, D 3134 states that a rough approximation is the lightness difference $\Delta L^*$ for colors that match the standard in hue and saturation. As such, color tolerances are generally calculated as mean CIE 1976 (L*a*b*) errors. In many cases, this average of errors relates well to customer satisfaction with print job color reproduction. In other cases, however, customers may find color print jobs with similar average error values quite unappealing.

DETAILED DESCRIPTION

As mentioned above, traditional color tolerances involving color fidelity may not always accurately reflect the way a human will perceive the quality of a printed image. For example, it is believed that if the divergence of the field of error vectors of reproduced colors in a printed image is zero, color constancy allows humans to perceive the color reproduction as being of good quality, even if the average error is in fact relatively large. However, if the average color errors are small but the error vectors are random, it is believed the image quality may be perceived by humans as poor. To provide one brief example, consider a catalog selling denim garments. Some pages might have denim jeans in original, washed, and stone-washed denim, while a second page might have matching jackets. The specific hue of each garment is less important than the relative color of each garment to allow a person to match jackets to jeans. Many human color discrimination tests, such as the Farnsworth-Munsell 100-hue test, thereby test human subjects abilities to distinguish between minute differences in discrete color swatches. The more accurately a human subject arranges color swatches in a proper order, the better the human subject's ability to distinguish between different colors.

The present disclosure will describe a way of printing color documents so as to assess color integrity at a tolerance over at least a color range of interest. As used herein, "color integrity" is preserved in a reproduction when a color scale is linearly ordered, and this order is preserved in the reproduction. For example, a scale of color swatches through the color range of interest may be printed when a color document is printed (e.g., in crop margins of the document or on a separate page). By determining the number of permutations of color swatches in the printed scale of color swatches, the quality of the printed document as would be perceived by a human may be generally ascertained. Thus, based on the presence of permutations of color swatches in the scale of color swatches, a print service provider (PSP) can select an efficient manner of printing the color documents that remains within a satisfactory tolerance for printed color integrity.

Technical effects of the present disclosure thus include improved customer satisfaction and more efficient commercial printing. PSP operators may be able to select the least expensive manner of printing a color print job that reproduces colors with sufficient integrity to be perceived as satisfactory by a human observer. It should be appreciated that even when conventional color reproduction tolerance scoring (e.g., scoring by average color errors) indicates satisfactory printing, a lack of color integrity may be unappealing to human observers. As such, conventionally inexplicably unsatisfactory print jobs may be avoided and, accordingly, printing resources saved.

Figure 1:
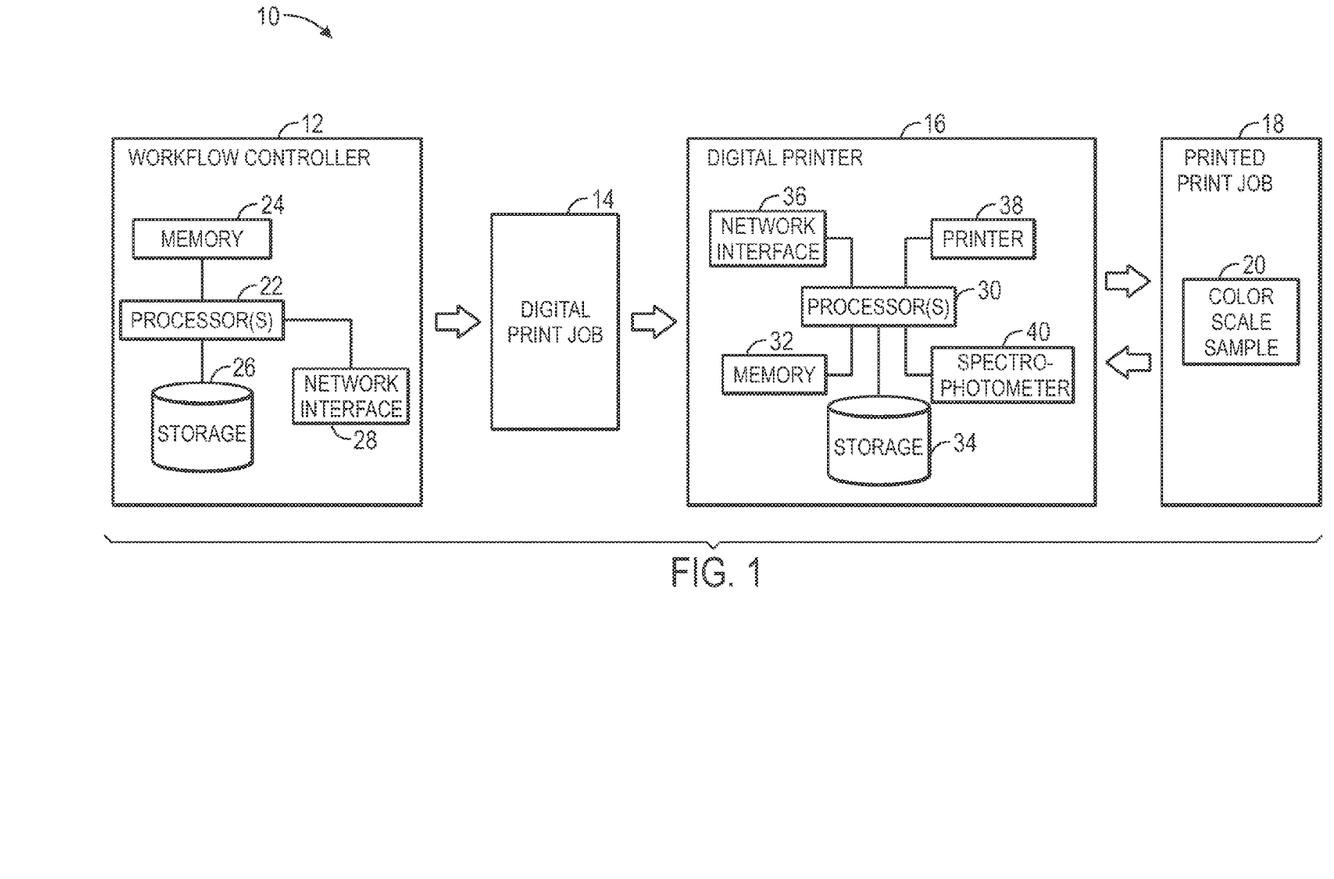
FIG. 1 is a block diagram illustrating a system for printing color print jobs with a color tolerance based on color integrity, in accordance with an embodiment.

For example, as shown by a digital printing system 10, a workflow controller 12 or other computing system may transmit a digital version of a print job 14 to a digital printer 16. The digital version of the print job 14 may be, for example, a PDF document or any other suitable digital document or image format. Based on the digital version of the print job 14, the digital printer 16 may print a print job 18. Associated with the print job 18 may be a color scale sample 20. The digital printer 16 may print the color scale sample 20 on crop margins of the printed print job 18 or on a separate page.

The color scale sample 20 may be used to determine a degree of color integrity of the printed print job 18. That is, the color scale sample 20 may relate to the degree to which a human observer will find that the printed print job 18 has faithfully reproduced. The color scale sample 20 may be calculated and generated by the workflow controller 12 or the digital printer 16, or may be provided by a customer providing the digital version of the print job 14. It should also be appreciated that the workflow controller 12, the digital printer 16, or any other suitable computer system may generate a color scale sample 20 not necessarily associated with a particular print job. Such a color scale sample 20 unaffiliated with a specific print job may be used, for example, to diagnose general operations of the digital printer 16.

The workflow controller 12 may represent any suitable computer system capable of generating the color scale sample 20 and/or providing the digital print job 14 to the digital printer 16. Additionally or alternatively, the digital printer 16 may be capable of calculating the color scale sample 20. The various functional blocks of the workflow controller 12 and the digital printer 16 in FIG. 1 may represent hardware elements, processor-executable instructions, or a combination of both. The functional blocks of the workflow controller 12 and the digital printer 16 are merely intended to represent by example certain elements that could appear in a particular implementation. In other implementations, the workflow controller 12 and/or the digital printer 16 may have more or fewer components, as may be desired. By way of example, the workflow controller 12 may be a model of an HP server, desktop, or notebook computer, and the digital printer 16 may be a model of an HP digital printing press.

In the workflow controller 12, processor(s) 22 and/or other data processing circuitry may be operably coupled to memory 24 and storage 26 to execute instructions for carrying out the presently disclosed techniques. These instructions may be encoded in programs that may be executed by the processor(s) 22. The instructions may be stored in any suitable article of manufacture that includes at least one tangible, computer-readable medium that at least collectively stores these instructions or routines, such as the memory 24 or the storage 26. The memory 24 and/or the storage 26 may include, for example, random-access memory, read-only memory, rewriteable memory, a hard drive, and/or optical discs.

The workflow controller 12 may also include input/output (I/O) ports such as a network interface 28. The network interface 28 may provide communication via a personal area network (PAN) (e.g., Bluetooth), a local area network (LAN) (e.g., WiFi), a wide area network (WAN) (e.g., a 3G or 4G cellular network), and/or the like. As should be appreciated, the workflow controller 12 may include a variety of other components, such as a power supply, a keyboard, a mouse, a track pad, and/or a touch screen interface. Also, the workflow controller 12 may be, or may be associated with, a manufacturing execution system (MES) used by the PSP to control how the digital print job 14 will be fulfilled through the PSP production floor (including, for example, processing by the digital printer 16).

The digital printer 16 may include processor(s) 30, memory 32, and storage 34. Like the processor(s) 22, memory 24, and storage 26 of the workflow controller 12, the processor(s) 30, memory 32, and storage 34 may be used to perform various instructions for carrying out the techniques disclosed herein. Accordingly, such instructions may be encoded in programs that may be executed in the processor(s) 30 and stored in any suitable article of manufacture (e.g., the memory 32 and/or the storage 34). Thus, by way of example, the memory 32 and/or the storage 34 may store data and/or executable instructions on random-access memory, read-only memory, rewriteable memory, a hard drive, and/or optical discs.

The digital printer 16 may also include input/output (I/O) ports such as a network interface 36. Through the network interface 36, the digital printer 16 may receive data and instructions from the workflow controller 12. For example, the digital printer 16 may receive the digital print job 14 via the network interface 36.

The digital printer 16 may use a printer mechanism 38 to print the printed print job 18 using a variety of techniques. In particular, different operational settings of the printer mechanism 38 may be more or less expensive and may result in color reproduction that may be more or less satisfactory to a human observer. For example, the printer mechanism 38 may print the printed print job 18 using different numbers of inks or different qualities of inks and may print on media of any of a variety of qualities. To provide one example, the Indichrome® system by HP may use six inks to produce high-quality images. Additionally or alternatively, the digital printer 16 may use different manners of processing the digital version of the print job 14 that cause the printer mechanism 38 to print the printed print job 18 at various costs and varying qualities. These different manners of processing the digital version of the print job 14 may include, for example, different manners of determining black skeleton, gamut mapping, and/or halftoning, by which the printer mechanism 38 may print the printed print job 18. In general, a more expensive manner of operating the printer mechanism 38 may be associated with higher quality color reproduction.

The printer mechanism 38 may not always reproduce the colors of the printed print job 18 in a manner satisfactory to a human observer. Thus, a PSP operator or a spectrophotometer 40 of the digital printer 16 may analyze the color scale sample 20 to enable the determination of whether the printed print job 18 was satisfactorily printed. The spectrophotometer 40 may represent any suitable spectrophotometric device or camera capable of detecting colors in a color space to a suitable level of precision (e.g., less than 0.5 in the CIE 1976 (L*a*b*) color space). The spectrophotometer 40 may ascertain the colors of the color scale sample 20, providing an indication of these colors to the processor(s) 30 of the digital printer 16. The digital printer 16 and/or workflow controller 12 may determine the extent to which the color scale sample indicates that the color integrity of the printed print job 18 fits within a color integrity tolerance agreed upon by the PSP and the customer.

Figure 2:
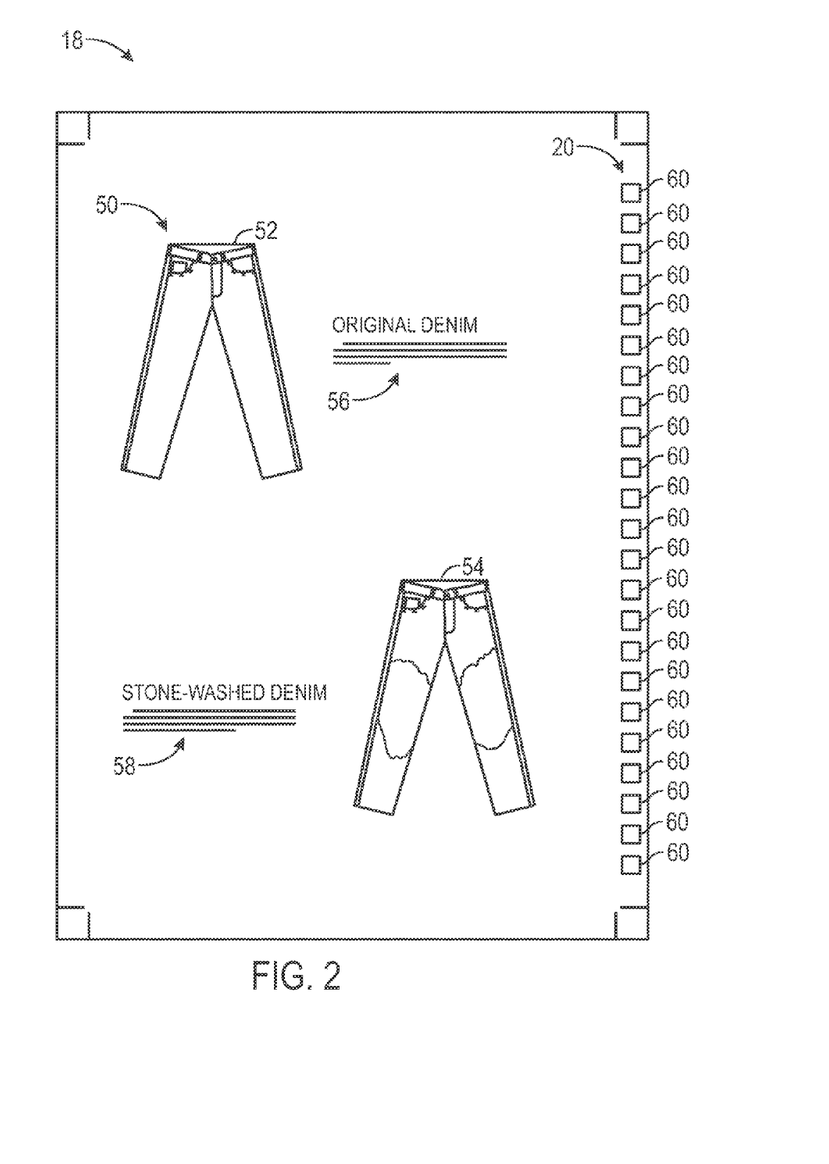
FIG. 2 is a schematic representation of a print job with a scale of color swatches for ascertaining a color tolerance based on color integrity, in accordance with an embodiment.

As mentioned above, the color scale sample 20 may be printed in a crop margin of the printed print job 18, as generally illustrated in FIG. 2. Alternatively, the color scale sample 20 may be printed as separate document. In the example of FIG. 2, a catalog page 50 with merchandise imagery 52 and 54 and associated text 56 and 58 represents the printed print job 18. The merchandise imagery 52 and 54 respectively represent different styles of denim clothing, here original denim and stone-washed denim. These clothing styles may be slightly different from one another in that they are relatively different shades of blue. A scale of color swatches 60 may form the color scale sample 20, which may be printed in a crop margin of the printed print job 18.

The precise fidelity of certain blue colors used in printing the merchandise imagery 52 and 54 may be less important than the integrity (relative position) of these colors. That is, a consumer reading the catalog page 50 may be more concerned with the relative difference in colors of the merchandise imagery 52 and 54 than whether the colors fall within an average error. Thus, the scale of color swatches 60 of the color scale sample 20 may be chosen to represent a range of blues that should increase monotonically (i.e., without transposition) across the color range of interest.

For example, the lowermost color swatch 60 may be a shade of dark blue, while the uppermost color swatch 60 may be a shade of light blue. When the digital printer 16 has printed the printed print job 18 in a way that is expected to be perceived as proper by a human observer, the scale of color swatches 60 will gradually transition from the shade of dark blue to the shade of light blue without transposition of any of the color swatches 60. In some cases, some colors of the scale of color swatches may be transposed, meaning that the color scale sample 20 does not vary monotonically through the color range of interest. The presence of transpositions of the color swatches 60 may indicate that the digital printer 16 has not printed the colors of the printed print job 18 with total color integrity. The extent of the transpositions of the color swatches 60 across the color range of interest may indicate the extent to which a human observer would perceive the printed print job 18 colors as inaccurate. Further, although the example of FIG. 2 generally illustrates a color scale sample 20 ranging over a color range of interest, in other cases, the color scale sample 20 may generally cover a more general color range. For example, as will be described further below with reference to FIGS. 13-15, the color scale sample 20 may include a scale of color swatches 60 representing those colors used in a color discrimination test such as the Farnsworth-Munsell 100-hue test.

The color scale sample 20 may be used to ascertain an efficient mode of printing the printed print job 18 in the digital printer 16. Specifically, as represented by a flowchart 70 of FIG. 3, the degree of monotonicity of the color scale 20 may indicate the degree to which a human observer Will perceive the printed print job 18 colors to have been printed correctly. The flowchart 70 of FIG. 3 may begin when the color range of interest to be reproduced in the color scale sample 20 is determined (block 72). In some cases, the workflow controller 12 or the digital printer 16 may determine color range of interest. In some cases, an operator of the workflow controller 12 or the digital printer 16, or a customer supplying the digital print job 14, may specify the color range of interest.

Figure 3:
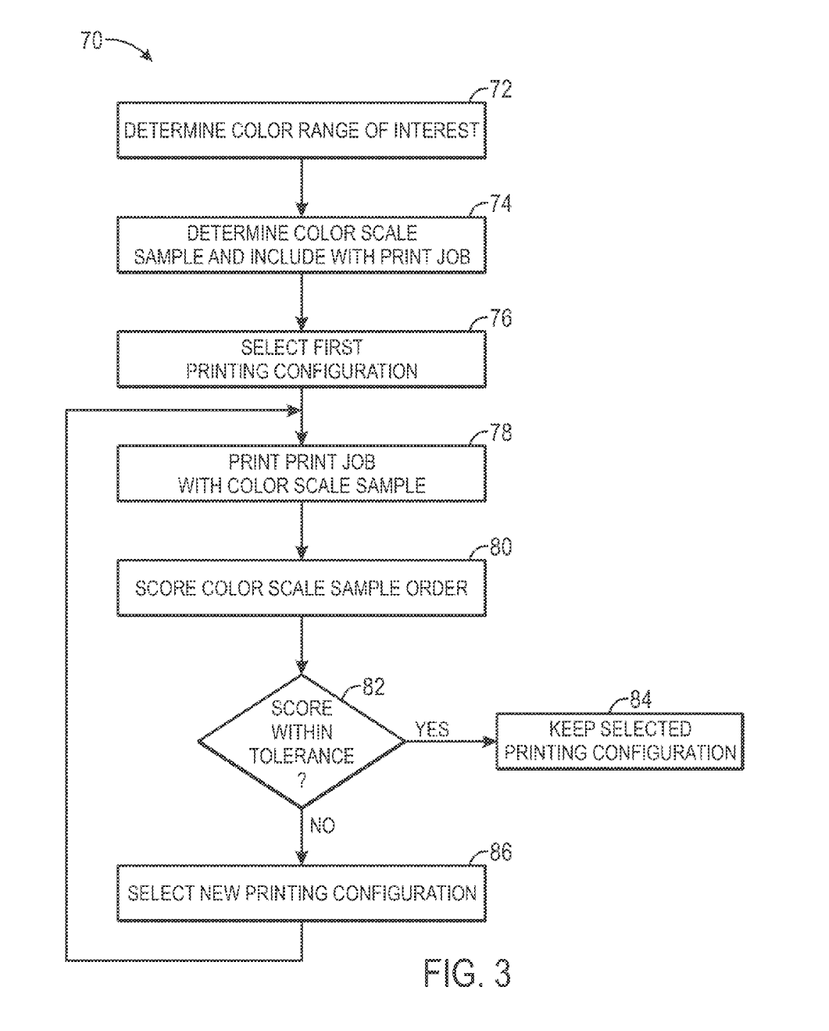
FIG. 3 is a flowchart describing an embodiment of a method for printing color documents within a color tolerance based on color integrity using the scale of color swatches, in accordance with an embodiment.

To provide one example, an operator of the workflow controller 12 and/or the digital printer 16, or the customer supplying the digital print job 14, may select a range of colors of interest by supplying two colorimetric points (e.g., two points of the 1976 CIE (L*a*b*) color space) and the number of steps and/or distance between steps between the two colorimetric points. To provide another example, the workflow controller 12 and/or the digital printer 16 may automatically determine the color range of interest of the color scale sample 20 by determining which range of colors features most prominently in the digital print job 14. In a further example, the workflow controller 12 and/or the digital printer 16 may automatically determine the color range of interest of the color scale sample 20 by determining a color range in the digital print job 14 in which many closely-spaced colors are used. In some cases, the color range of interest of the color scale sample 20 may be the range of colors used in the Farnsworth-Munsell 100-hue test.

In any way determined, the color range of interest may be defined as a color range between two colorimetric points. For example, the workflow controller 12, digital printer 16, and/or other computer system (e.g., a computer system belonging to the customer supplying the digital version of the print job 14) may determine the color scale sample 20 to be printed by the digital printer 16 based on two colorimetric points that define the color range of interest (block 74). Additionally or alternatively, the workflow controller 12, digital printer 16, and/or other computer system may consider a number of steps and/or distance between steps used between the two colorimetric points.

The two colorimetric points may be understood to be start and end points of the color scale sample 20 and may be defined in any suitable color space. For example, the start and end points may be defined in the CIE 1976 (L*a*b*) color space, but any other suitable n-dimensional colorimetric color space may be employed. The workflow controller 12 and/or digital printer 16 may select a fixed step that will be used between the color swatches 60 of the color scale sample 20. The fixed step may be based on a step requested by a user (e.g., a PSP operator or customer). By way of example, the fixed step may be clamped at the lower end to 0.1 units, given that a value below 0.3 generally may not be meaningful, since the tolerance of the spectrophotometer 40 may be approximately 0.3.

For simplicity, it may not be necessary that the length of the color scale sample 20 be specified to a multiple of the fixed step size between the color swatches 60. Rather, the color scale sample 20 may be extended as needed on both ends to fit a whole number of steps of the specific fixed size. Thus, given the start of end points of the color scale sample 20 and the fixed step size, accounting as well for extending the color scale sample 20 as needed, the whole number of color scale swatches 60 may be determined. At least three are needed for the color scale sample to meaningfully represent the degree of transposition of the digital printer 16 in the color range of interest of the color scale sample 20. Thereafter, the workflow controller 12 and/or the digital printer 16 may allocate an array containing the values of the color swatches 60 in the color space (e.g., CIE 1976 (L*a*b*)), and these color values may be calculated for each of the color swatches 60. A particular example representing the determination of the color scale sample 20 appears further below with reference to FIGS. 4 and 5.

With continued reference to flowchart 70 of FIG. 3, having determined the color scale sample 20, an initial printing configuration for printing the printed print job 18 on the digital printer 16 may be selected (block 76). For example, a PSP operator or the workflow controller 12 and/or the digital printer 16 may select as the initial printing configuration a printing configuration that is expected to produce the best color reproduction with the lowest printing costs, while remaining within a color tolerance agreed upon by the PSP and customer. Any suitable variables of the printing configuration may be selected. These printing configuration variables may include, for example, the manner of determining black skeleton, gamut mapping, and/or halftoning; the number and/or quality of printer inks used by the digital printer 16; the medium the printed print job 18 is to be printed on; the color management system employed by the digital printer 16; or any other suitable factors that could impact the printing costs and/or color reproduction integrity of the digital printer 16.

In general, the higher the quality, the more expensive the printing configuration. Thus, it may be desirable to select as the initial printing configuration the least expensive printing configuration that is expected to produce the printed print job 18 within the color integrity tolerance agreed upon by the PSP and the customer. If there is no expectation as to which printing configuration will minimally suffice, the absolute least expensive printing configuration may be selected as the initial printing configuration. As will be discussed below, if this initial printing configuration does not produce satisfactory results, a more expensive, higher quality printing configuration may be selected instead.

Having selected the initial printing configuration, the digital printer 16 may print the printed print job 18 and/or the color scale sample 20 (block 78). Additionally or alternatively, the color scale sample 20 may not be physically printed, but rather may be simulated from a computer model using the workflow controller 12, the digital printer 16, and/or any other suitable computer system. Based on the printed or simulated color scale sample 20, the quality of the printing configuration selected may be ascertained. The color scale sample 20 may be scored in any suitable manner to determine a level of quality related to the severity of any transpositions that appear in the color scale sample 20. In one example, the color scale sample 20 may be scored by visual inspection by a PSP operator (e.g., a PSP operator with a high degree of color discrimination). In another example, the color scale sample 20 may be scored by the workflow controller 12 and/or the digital printer 16 by detecting the colors of the color swatches 60 using the spectrophotometer 40, projecting the detected colors onto a line in a color space, and determining the degree to which permutations in color swatches 60 appear. Manners of detecting and scoring the color scale sample 20 will be described further below.

If the resulting score falls within a suitable tolerance (decision block 82), the printed print job 18 and the selected printing configuration may be understood to be satisfactory (block 84). The digital printer 16 may use this satisfactory printing configuration to print any remaining copies of the printed print job 18. Otherwise, if the score is not within the tolerance (decision block 82), a new printing configuration may be selected (block 86). Specifically, the new printing configuration may be a printing configuration that is more likely to result in a higher quality print job, even though the new printing configuration may be more expensive. Thereafter, the digital printer 16 may print at least the color scale sample 20 once more, where it may be scored color scale sample once more (block 78), so that it may be scored (block 80) and tested once more (decision block 82).

As mentioned briefly above, scoring the color scale sample 20 at block 80 may take place in any suitable manner. For example, a PSP operator with a suitably satisfactory color discrimination capability may score the color scale sample through a visual examination of the scale of color swatches 60 of the color scale sample 20. For example, the PSP operator may discern the transpositions in colors in the color scale sample 20. Additionally or alternatively, the spectrophotometer 40 of the digital printer 16 may ascertain a precise value of each of the color swatches 60 of the color scale sample 20, from which transpositions may be determined. Based on these transpositions, the PSP operator, the workflow controller 12, the digital printer 16, and/or any other suitable computer system may score the color scale sample 20 according to any suitable scoring method, such as those discussed below.

In one example, the percentage of color scale transpositions may represent one manner of scoring the color scale sample 20. In another example, any of the scoring methods used in scoring human color discrimination tests, such as the Farnsworth-Munsell 100-hue test, may be employed.

In general, scoring the color scale sample 20 may initially involve determining any color transpositions between the original calculated color scale sample 20 determined before printing and the printed color scale sample 20 that ultimately results. The original calculated rank order may represent the ideal order that the colors of the color swatches 60 of the color scale sample 20 would be printed if the digital printer 16 made no errors. To identify color transpositions, a determined rank order may be compared to the calculated rank order or an estimation of the calculated rank order. The determined rank order represents the order in which the color swatches 60 of the color scale sample 20 actually appear when printed by the digital printer 16. As will be described below, the comparison between the calculated rank order and the determined rank order may involve projecting the determined rank order over a line through a color space. This line may be a best fit line through the determined rank order (i.e., an estimation of the calculated rank order) or a line defined by the starting and ending points used to generate the color scale sample (i.e., the original calculated rank order).

When scoring is carried out in the manner of the Farnsworth-Munsell 100-hue test manual, individual scores for each of the color swatches 60 may be determined and these individual scores added together. The individual scores for each of the color swatches 60 may be calculated as the sum of the differences between the number of its calculated color swatch 60 rank order and the number of the calculated rank order of the color swatch 60 adjacent to it. In the case of no transposition, the sum of the differences is 2. Thus, a value of 2 is subtracted from each individual score. The total score is obtained by summing the individual scores. The score may or may not be normalized over the total number of color swatches 60 or the total color range employed in the color scale sample 20. One example of this manner of scoring appears in Table 1 below.

TABLE 1

| 2 | 3 | 4 | 5 | 6 | 7 | 8 | 9  | 10 | 11 | 12 | 13 |
|---|---|---|---|---|---|---|----|----|----|----|----|
| 2 | 3 | 5 | 4 | 6 | 7 | 8 | 11 | 9  | 13 | 10 | 12 |
| 2 | 3 | 3 | 3 | 3 | 2 | 4 | 5  | 6  | 7  | 5  | 5  |
| 0 | 1 | 1 | 1 | 1 | 0 | 2 | 3  | 4  | 5  | 3  | 3  |

In Table 1, the first row represents the original rank order of the calculated color scale sample. The second row is the rank order in which the actual printed color scale sample 20 appears. The third row contains the differences between the first row and the second row (assuming that the next rank order on the right is 15). The fourth row represents the scores. In any case, it may be appreciated that any suitable manner of scoring may be used, and the above discussion is provided by way of example.

Figure 4:
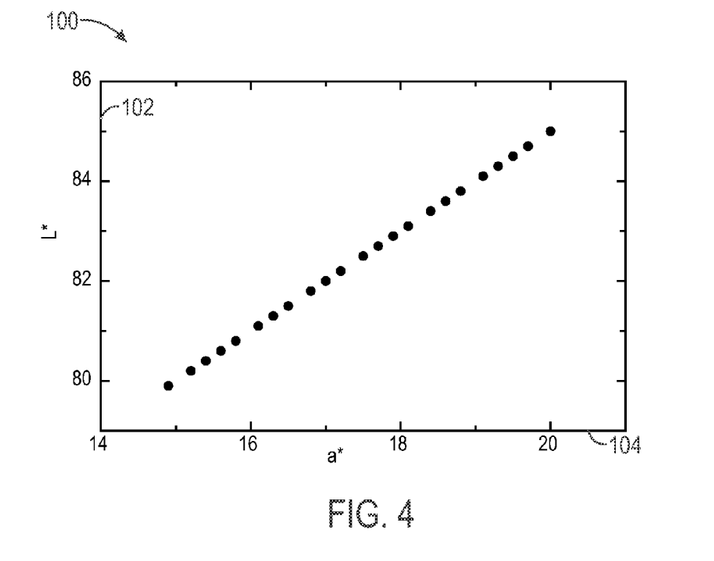
FIGS. 4 and 5 are plots modeling computed color values to be printed as a scale of color swatches for ascertaining a color tolerance, in accordance with an embodiment.
Figure 5:
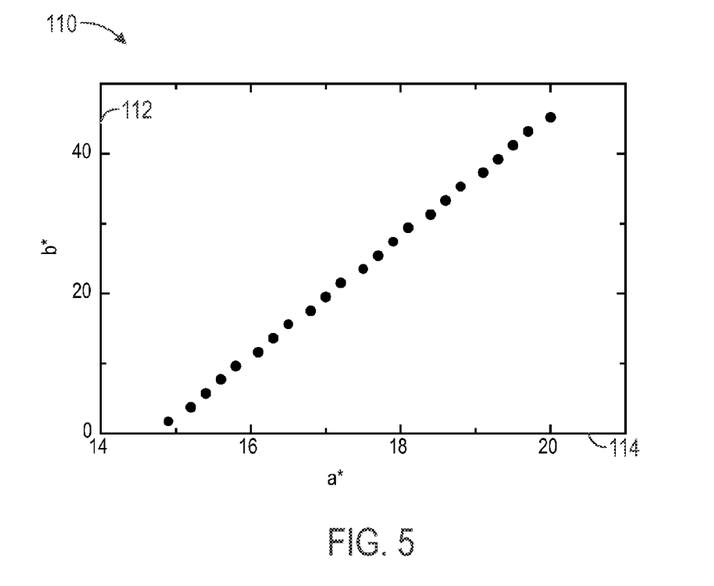

FIGS. 4-12 represent an example of a color scale sample 20 that is generated, printed, and tested to determine color integrity of the digital printer 16. In particular, FIGS. 4 and 5 relate to the calculation of the color scale sample 20. The example of FIGS. 4 and 5 uses the case of CIE 1976 (L*a*b*), the dimensions of which are L*, a*, and b*. To determine the color range over which the color swatches 60 may be prepared, given the starting and ending points, a parametric representation of line segments may be employed. A parametric equation of a line is defined in terms of its end point and a parameter $t \in [0,1]$ for points in the line segment. This parameter t is a convenient scalar quantity introducing an order. More formally, a line segment from $P_0$ to point $P_1$ is defined by the parametric equation:

$$P(t)=(1-t)P_0+t(P_1) \quad (1).$$

A point at the fraction of a line segment is found by setting t to this fraction. For example, consider a color scale sample 20 defined by starting and endpoint colors with CIE 1976 (L*a*b*) coordinates (80, 15, 2) and (85, 20, 45), respectively. When 23 color swatches are used, spaced by 2 units apart, the following CIE 1976 (L*a*b*) coordinates will be used as the color swatches 60:

(79.9, 14.9, 1.7), (80.2, 15.2, 3.7), (80.4, 15.4, 5.7), (80.6, 15.6, 7.7), (80.8, 15.8, 9.6), (81.1, 16.1, 11.6), (81.3, 16.3, 13.6), (81.5, 16.5, 15.6), (81.8, 16.8, 17.5), (82.0, 17.0, 19.5), (82.2, 17.2, 21.5), (82.5, 17.5, 23.5), (82.7, 17.7, 25.4), (82.9, 17.9, 27.4), (83.1, 18.1, 29.4), (83.4, 18.4, 31.3), (83.6, 18.6, 33.3), (83.8, 18.8, 35.3), (84.1, 19.1, 37.3), (84.3, 19.3, 39.2), (84.5, 19.5, 41.2), (84.7, 19.7, 43.2), and (85.0, 20.0, 45.2).

The points of this scale are plotted in FIGS. 4 and 5. Non-uniformities are due to rounding the coordinates to one decimal digit. Specifically, FIG. 4 represents a plot 100 with an ordinate 102 representing L* values and abscissa 104 representing a* values. In FIG. 5, a plot 100 includes an ordinate 112 representing b* values and an abscissa 114 representing a* values. As can be seen, these plotted values are monotonic, increasing without decreasing in a constant manner. From these values, color swatches 60 of a color scale sample 20 may be determined and printed by the digital printer 16.

Figure 6:
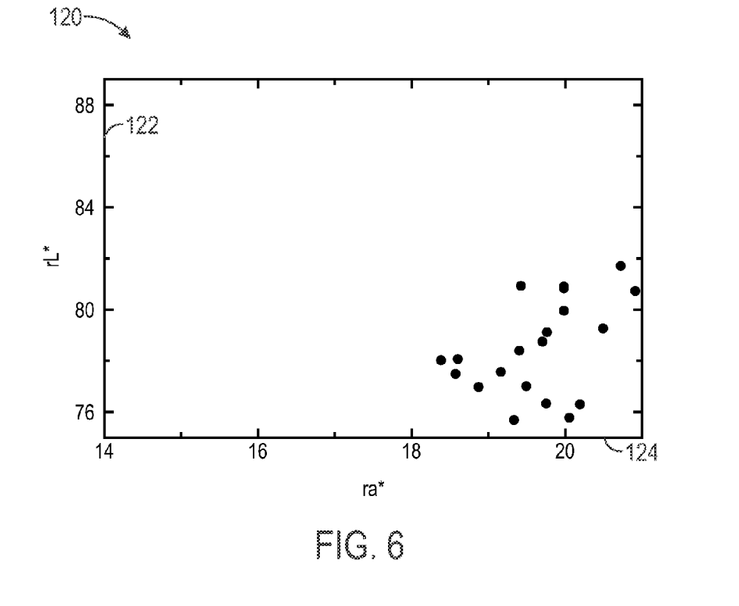
FIGS. 6 and 7 represent plots of actual printed values of the scale of color swatches when the scale of color swatches of FIGS. 4 and 5 are printed, in accordance with an embodiment.
Figure 7:
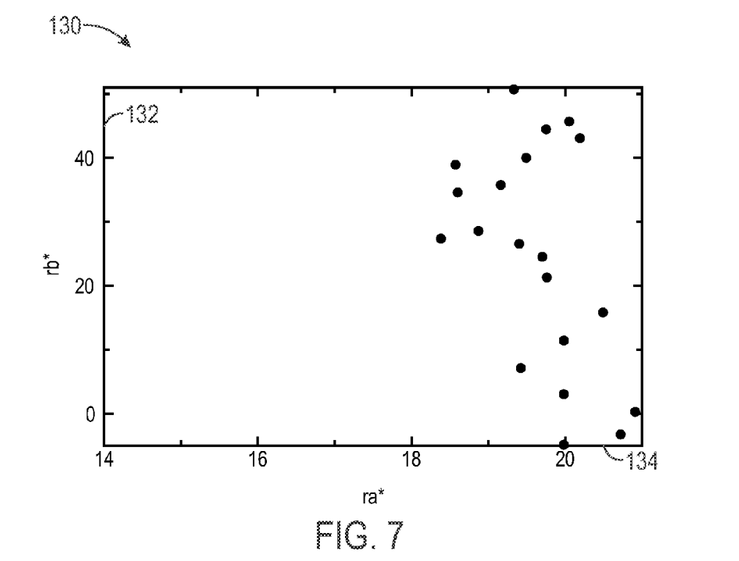

Continuing with this example, FIGS. 6 and 7 represent printed results when the color coordinates of FIGS. 4 and 5 were printed on an HP Color LaserJet CM6040 digital printer. The measurements of the points illustrated in FIGS. 6 and 7 were performed with a Gretag SPM100-II spectrophotometer with white backing, 2° observer, and $D_{50}$ illuminant, FIG. 6 represents a plot 120 with an ordinate 122 of L* and an abscissa 124 of a* (prefixed with the letter r to represent that these values are reproduced (i.e., printed) values). FIG. 7 is a plot 130 with an ordinate 132 of b* and an abscissa 134 of a* (prefixed with the letter r to indicate that these values are reproduced (i.e., printed) values). The plots 120 and 130 of FIGS. 6 and 7 clearly differ from the plots 100 and 110 of FIGS. 4 and 5, meaning that the colors have not been printed properly.

Figure 8:
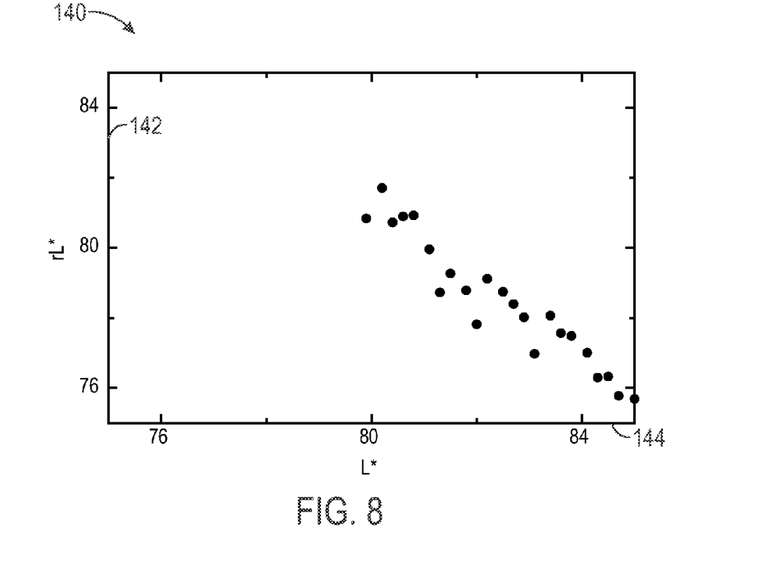
FIGS. 8-10 are plots representing comparison between the actual printed values of the scale of color swatches of FIGS. 6 and 7 against the calculated of the scale of color swatches of FIGS. 4 and 5, in accordance with an embodiment.
Figure 9:
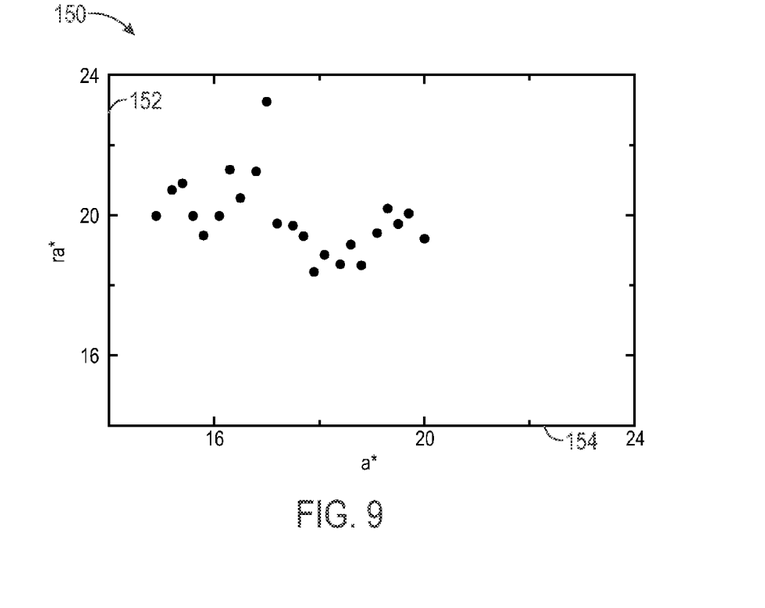
Figure 10:
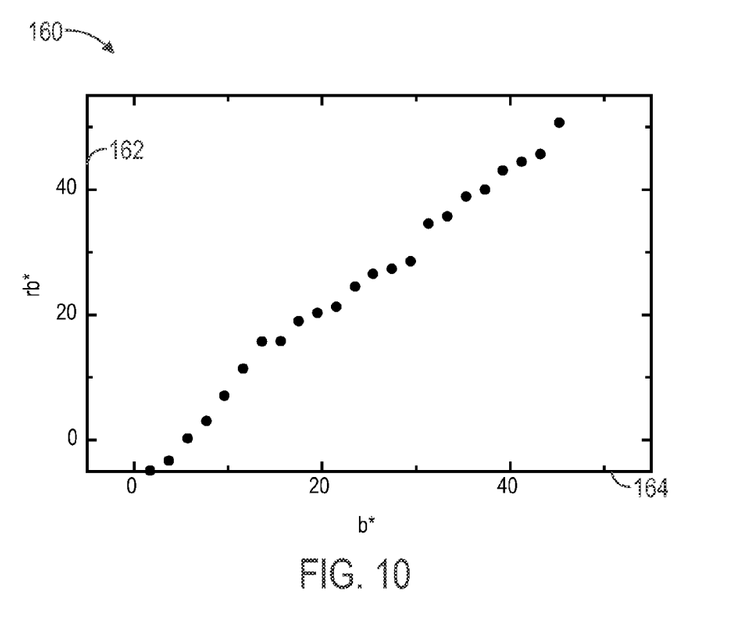

Printing errors may become apparent when the original versus the reproduced colors in each coordinate are plotted, as generally illustrated in FIGS. 8, 9, and 10. FIG. 8 illustrates a plot 140 with an ordinate 142 representing the reproduced L* values against an abscissa 144 of the expected, calculated L* values. FIG. 9 is a plot 150 with an ordinate 152 representing the reproduced a* values against an abscissa 154 of the expected, calculated a* values. Finally, FIG. 10 is a plot 160 with an ordinate 162 representing the reproduced b* values against an abscissa 164 of the expected, calculated b* values. From FIGS. 8-10, it may be seen that in the color range of interest—from (80, 15, 2) to (85, 20, 45)—the lightness scale is inverted and there is not modulation, but rather just noise, on the red—green axis.

To find the permutations in the reproduction of the color scale, the measured values may be projected against a line segment that generally extends across the color range of interest. Specifically, the measured colorimetric coordinates of each color swatch 60 may be projected on a line segment and the parameter s, representing a distance on the projected line, may be calculated for each point. An equation defining the parameter s will be discussed below. If there are no permutations, the values s will be monotonically increasing. For a line segment on which to project the measured values, there may be at least two options. The first option may be to find a line through linear regression or any other suitable technique using the measured colorimetric points of the color swatches 60. Doing so would assess how well the order is preserved. The second option may be to project the measured colorimetric points on the line formed by the original color scale (e.g., a line from (80, 15, 2) to (85, 20, 45)). This second option would deliver a stricter merit, since points that have different projections on the linear regression might have the same projection on the original line segment.

Figure 11:
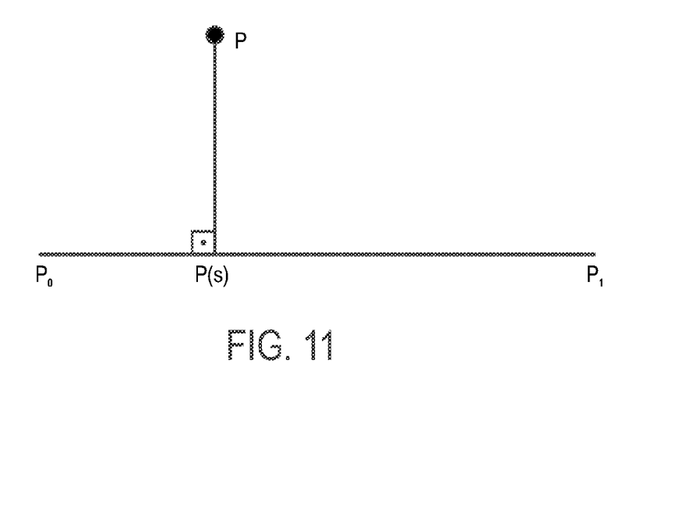
FIGS. 11 and 12 are illustrations representing a manner of projecting a printed value of a scale of color swatches onto a line representing a range of colors, in accordance with an embodiment.
Figure 12:
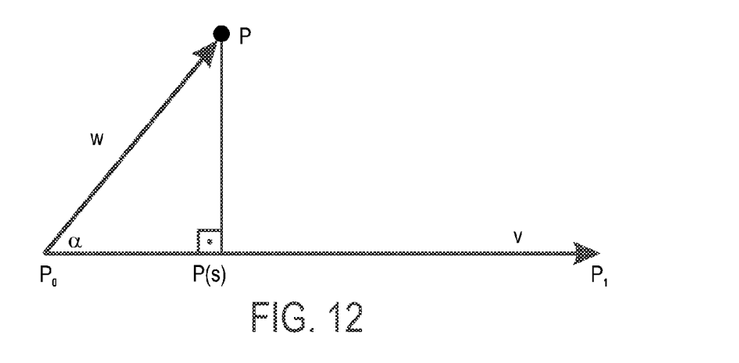

In a parametric representation, the projection of a point on a segment $P_0$ next to $P_1$, as generally illustrated in FIG. 11, may be determined as follows. Specifically, given the line segment $P_0$, $P_1$, and a point P, the parameter s of the point P orthogonal projection on the line segment may be determined. For example, turning to FIG. 12, two vectors $v=(P_1-P_0)$ and $w=(P-P_0)$ may be introduced. An angle $\alpha$ represents the angle between the two vectors v and w. The value s may be obtained according to the following relationship:

$$s = \frac{|w|\cos\alpha}{|v|} = \frac{w \cdot v}{v \cdot v}. \quad (2)$$

Thus, by introducing the two vectors v, w, the parameter s can be calculated as the ratio of two scalar products. By determining the parameters s for all of the measured colorimetric points, it may become apparent where and to what degree color transpositions and permutations have occurred. Determining the parameter s may further involve discretizing the value of the parameter s to a meaningful difference. In one example, the parameter s may be discretized to the tolerance of the spectrophotometer 40. Additionally or alternatively, the parameter s may be discretized to one CIE 1976 (L*a*b*) unit, since one CIE 1976 (L*a*b*) unit loosely corresponds to a just noticeable difference (JND). Precise meaningful values to which to discretize the parameter s may be determined experimentally through a psychophysics experiment.

Once the measured colorimetric values of the color scale sample 20 have been projected on the line segment, the relative positions of the color swatches 60 may be calculated. For example, the positions of the various color swatches 60 based on the values of the parameter s may be found through a binary search after sorting the swatches. Color swatches 60 whose relative position cannot be distinguished may be ranked ahead or behind one another randomly or in a predetermined manner.

From the determined rank order of the color swatches 60, the color scale sample 20 may be scored (e.g., in the manner discussed above). When the color scale sample 20 score is normalized to the color range of interest over which the color scale sample 20 was determined, the color reproduction integrity of the printing configuration of the digital printer 16 for the color range of interest may be compared to human color discrimination standards. For example, the score of the color scale sample 20 may be normalized to the same scale as the Farnsworth-Munsell 100-hue test. Thus, a normalized score of 0 might indicate the printing configuration of the digital printer 16 as "Golden," a normalized score of between 1 and 16 might indicate the printing configuration of the digital printer 16 as "Superior," a normalized score of between 17 and 100 might indicate the printing configuration of the digital printer 16 as "Average," and a normalized score of greater than 100 might indicate the printing configuration of the digital printer 16 as "Poor."

In the example of FIGS. 4-10, the conventional quality metric—the average error $\Delta E_{94}$—is a generally acceptable value of 5.6. Nevertheless, this printing configuration would be classified as "Poor" under the human color discrimination standard of the Farnsworth-Munsell 100-hue test when determined in the manner discussed above. Thus, although conventional color tolerances would indicate this printing configuration would produce acceptable results, a human might not perceive this printing configuration as reproducing colors properly.

Figure 13:
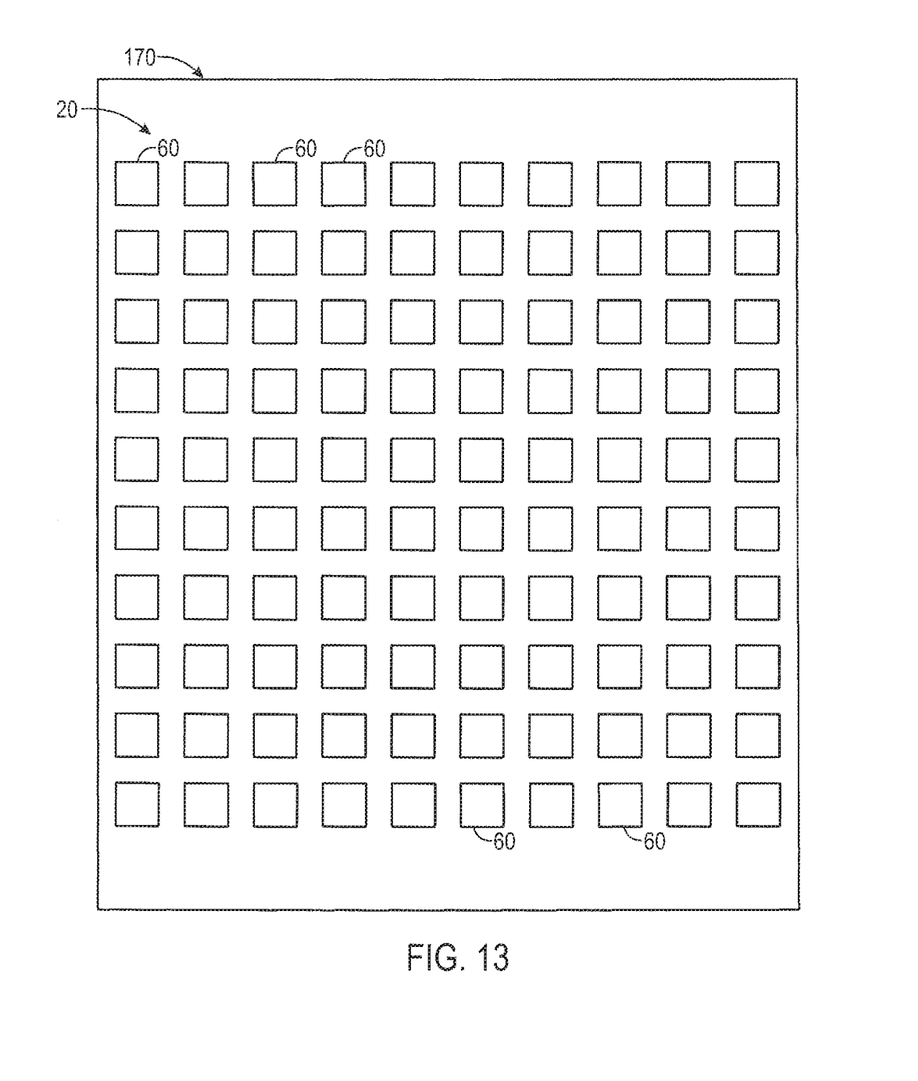
FIG. 13 is a schematic illustration of a printed document having a color scale sample that includes a wide range of colors, in accordance with an embodiment.
Figure 14:
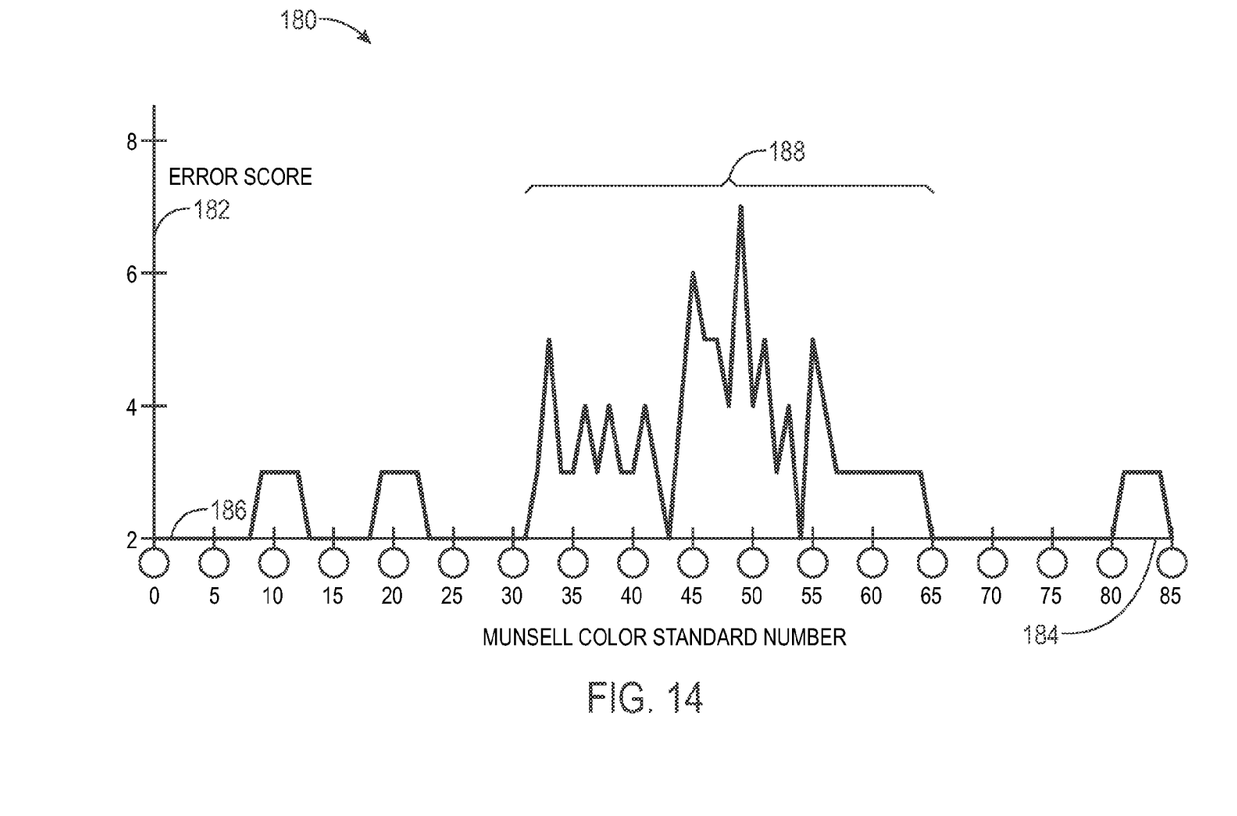
FIG. 14 is a plot modeling an error score representative of permutation errors of the printed document of FIG. 13, in accordance with an embodiment.
Figure 15:
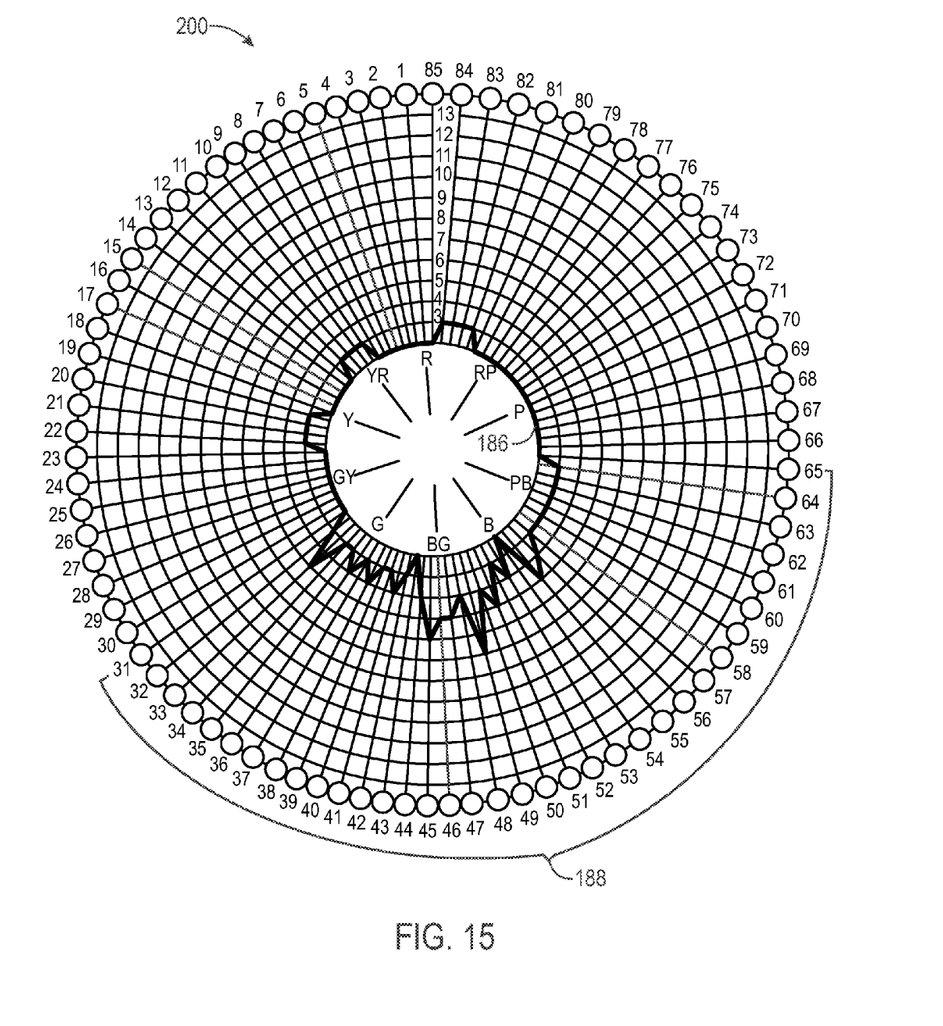
FIG. 15 is a polar projection of the plot of FIG. 14, in accordance with an embodiment.

The color scale sample 20 may not necessarily cover only a color range of interest relating to a particular print job. Indeed, as illustrated by FIGS. 13-15, the color scale sample 20 may represent a standard set of color swatches used in a human color discrimination test. Such a human color discrimination test may be, for example, the Farnsworth-Munsell 100-hue test or the HVC (Hue, Value, and Chroma) Color Vision Skill Test.

As shown in a print test page 170 of FIG. 13, the color scale sample 20 may include color swatches 60 generally used in the Farnsworth-Munsell 100-hue test. These color swatches 60 may cover a larger color range of interest than a typical print job, which may tend to include only a subset of these colors. Printing, measuring, and scoring the color scale sample 20 of the print test page 170 may enable the determination of a plot 180 as shown in FIG. 14. An ordinate 182 may include an error score and an abscissa 184 may represent Munsell color standard numbers. In the example of the plot 180 of FIG. 14, a rank order error curve 186 may indicate color sub-ranges where the printing configuration of the digital printer 16 is deficient. A sub-range 188 between about the Munsell color standard numbers 30 and 65 illustrates that the printing configuration of the digital printer 16 used in the present example is particularly weak in this sub-range. The values plotted in the plot 180 of FIG. 14 may also be visualized in a polar plot 200 shown in FIG. 15. In the polar plot 200, the rank order error curve 186 is projected onto the polar plot 200. The sub-range 188 is also shown.

It may be appreciated that using a color scale sample 20 over a wide range may reveal general color reproduction weaknesses associated with a printing configuration or a digital printer 16. For example, by occasionally testing different printing configurations or digital printers 16 using wide-range color scale samples 20 such as illustrated in FIG. 13, baseline expected color reproduction integrity may be estimated. Moreover, it may be seen that different digital printers 16 of a PSP production floor have color reproduction integrity strengths and weaknesses in different color sub-ranges. With this knowledge, the workflow controller 12 or a PSP operator may select the digital printer 16 on which a print job is to be printed based at least partly on the colors appearing in the print job. For example, a digital version of a print job 14 that primarily includes blue colors (or for which its own color scale sample 20 indicates a color range of interest through a blue range) may be routed to a digital printer 16 that is known to generally provide better relative blue color integrity.

What is claimed is:

1. A method comprising:
   selecting a current printing configuration of a digital printer to print a print job;
   printing a color scale sample according to the current printing configuration using the digital printer or simulating the printing of the color scale sample using a computer system, wherein the color scale sample includes at least three color swatches in a color range generally used in the print job, the at least three color swatches for the color scale sample varying monotonically along a line projected in a color space;
   scoring the printed or simulated color scale sample based at least in part on an extent to which transpositions of the color swatches occur over the color range; and
   when the score of the printed or simulated color scale sample indicates a print quality of the print job is or will be above a threshold level of quality when printed according to the current printing configuration, printing the print job according to the current printing configuration.

2. The method of claim 1, wherein the color scale sample is printed using the digital printer or simulated using the computer system, wherein the color scale sample comprises color swatches used in a human color discrimination test.

3. The method of claim 2, wherein the human color discrimination test comprises the Farnsworth-Munsell 100-hue test or the HVC Color Vision Skill Test.

4. The method of claim 1, comprising, when the score of the color scale sample indicates the print quality of the print job is not or will not be above the threshold level of quality when printed according to the current printing configuration, selecting a new printing configuration as the current printing configuration and repeating the method until the score of the color scale sample indicates the print quality of the print job is or will be above the threshold level of quality.

5. A tangible non-transitory machine-readable medium at least collectively comprising instructions executable by a processor, the instructions comprising:
   instructions to receive a set of data points indicating colors of color swatches of a printed color scale sample detected by a spectrophotometer;
   instructions to project the set of data points on a line in a color space; and
   instructions to determine an extent to which the projection of the set of data points increases monotonically along the line; and
   instructions to score the printed color scale sample based at least in part on the extent to which the projection of the set of data points increases monotonically along the line, wherein the score of the printed color scale sample indicates a print quality of the printed color scale sample.

6. The machine-readable medium of claim 5, wherein the instructions to score the printed color scale sample comprise instructions to score the printed color scale sample based at least in part on a human color discrimination test scoring technique.

7. The machine-readable medium of claim 5, wherein the instructions to project the set of data points on the line in the color space comprise instructions to project the set of data points on the line, wherein the line comprises a best fit line associated with the set of data points.

8. The machine-readable medium of claim 5, wherein the instructions to project the set of data points on the line in the color space comprise instructions to project the set of data points on the line, wherein the line comprises a line defined by two user-selected points in the color space that have been used in determining the color scale sample that is printed.

9. The method of claim 1, further comprising:
   prior to printing the color scale sample, determining the at least three color swatches for the color scale sample.

10. The method of claim 1, wherein the at least three swatches of the color scale sample correspond to an original rank order, and scoring the printed or simulated color scale sample based at least in part on an extent to which transpositions of the color swatches occur over the color range comprises:
  after printing the color scale sample or simulated the printing of the color scale sample, determining a rank order of the at least three color swatches for the printed or simulated color scale sample; and
  comparing the determined rank order to the original rank order.

11. The machine-readable medium of claim 5, further comprising:
  instructions to determine a rank order associated with the set of data points,
  wherein the extent to which the projection of the set of data points increases monotonically along the line is determined based at least in part on the rank order associated with the set of data points.

* * * * *